United States Patent
Pearson

(10) Patent No.: US 12,366,869 B2
(45) Date of Patent: Jul. 22, 2025

(54) PRESSURE SENSING VALVE

(71) Applicant: James E. Pearson, Downers Grove, IL (US)

(72) Inventor: James E. Pearson, Downers Grove, IL (US)

(73) Assignee: Robertshaw Controls Company, Itasca, IL (US)

( * ) Notice: Subject to any disclaimer, the term of this patent is extended or adjusted under 35 U.S.C. 154(b) by 324 days.

(21) Appl. No.: 18/182,897

(22) Filed: Mar. 13, 2023

(65) Prior Publication Data

US 2024/0310862 A1    Sep. 19, 2024

(51) Int. Cl.
```
G05D 7/06      (2006.01)
B67D 1/00      (2006.01)
F16K 7/17      (2006.01)
F16K 31/40     (2006.01)
F16K 37/00     (2006.01)
G01F 15/00     (2006.01)
```

(52) U.S. Cl.
CPC .......... G05D 7/0635 (2013.01); *B67D 1/0006* (2013.01); *B67D 2001/0093* (2013.01); *F16K 7/17* (2013.01); *F16K 31/404* (2013.01); *F16K 37/0041* (2013.01); *G01F 15/003* (2013.01)

(58) Field of Classification Search
CPC .......... G05D 7/0635; B67D 2001/0093; B67D 1/0006; F16K 7/17; F16K 31/404; F16K 37/0041; G01F 15/003
USPC ............. 137/487.5, 490, 489.5, 491, 505.36, 137/625.64, 12
See application file for complete search history.

(56) References Cited

U.S. PATENT DOCUMENTS

| | | | | |
|---|---|---|---|---|
| 2,815,041 | A | * 12/1957 | Rimsha | F15B 21/08 251/38 |
| 4,283,040 | A | * 8/1981 | Kolze | F16K 31/404 251/38 |
| 4,500,067 | A | 2/1985 | Zukausky | |
| 4,534,537 | A | * 8/1985 | Zukausky | F16K 31/404 251/38 |
| 5,145,145 | A | * 9/1992 | Pick | F16K 31/404 251/30.05 |
| 5,269,333 | A | 12/1993 | Richmond | |
| 5,487,528 | A | * 1/1996 | Richmond | G05D 7/0635 138/45 |
| 5,503,362 | A | * 4/1996 | Kim | D06F 39/08 74/57 |

(Continued)

*Primary Examiner* — Minh Q Le
(74) *Attorney, Agent, or Firm* — Reinhart Boerner Van Deuren P.C.

(57) ABSTRACT

A water valve having a housing defining an inlet and an outlet and a flow path extending therethrough, a pressure sensor configured to sense a water pressure at the inlet, a valve member situated within the flow path to open and close the flow path, a solenoid actuator, and a controller coupled to the pressure sensor to read the water pressure at the inlet and coupled to the solenoid to open and close the valve is provided. The controller determines an amount of time to hold the valve open in order to dispense an amount of water based on the water pressure. The controller commands the solenoid to open and close the valve to dispense the amount of water regardless of the water pressure. The controller is also configured to open the valve to reduce inlet pressure and prevent failure thereof.

11 Claims, 3 Drawing Sheets

(56) References Cited

U.S. PATENT DOCUMENTS

| | | | | |
|---|---|---|---|---|
| 5,813,652 | A | * | 9/1998 | Richmond .............. F16K 47/00 |
| | | | | 138/45 |
| 6,234,449 | B1 | * | 5/2001 | Ortner .................. F16K 31/404 |
| | | | | 251/35 |
| 6,460,367 | B1 | * | 10/2002 | DuHack ................ F25D 23/126 |
| | | | | 62/340 |
| 8,555,916 | B2 | * | 10/2013 | Ro .......................... F16K 17/34 |
| | | | | 137/497 |
| 11,112,025 | B2 | | 9/2021 | Bartow et al. |
| 2003/0071093 | A1 | | 4/2003 | Pinedjian et al. |
| 2007/0204930 | A1 | | 9/2007 | Phallen et al. |
| 2010/0139775 | A1 | * | 6/2010 | Ohmi .................... G01F 1/6847 |
| | | | | 137/12 |
| 2014/0097367 | A1 | | 4/2014 | Burt |
| 2014/0299204 | A1 | * | 10/2014 | Somani ................ G05D 7/0635 |
| | | | | 137/486 |
| 2014/0326912 | A1 | * | 11/2014 | Da Pont ............. F16K 31/0675 |
| | | | | 251/129.15 |
| 2016/0252912 | A1 | * | 9/2016 | Horwitz .................... G01F 1/88 |
| | | | | 137/2 |
| 2018/0283572 | A1 | * | 10/2018 | Bartow ............. B29C 66/24221 |
| 2018/0313463 | A1 | * | 11/2018 | Bergbauer ............ F16K 31/404 |
| 2019/0178389 | A1 | * | 6/2019 | Sawada .................... G05D 7/06 |
| 2021/0105959 | A1 | * | 4/2021 | Chen .................... F16K 31/404 |
| 2022/0333713 | A1 | * | 10/2022 | Wang ................. F16K 31/0675 |
| 2023/0266156 | A1 | * | 8/2023 | Ding .................... G05D 7/0635 |
| | | | | 137/12 |

\* cited by examiner

PRESSURE SENSING VALVE

FIELD OF THE INVENTION

This invention generally relates to valves, particularly to solenoid actuated valves utilized in a fluid flow path, and more particularly to water valves for precision dispensing of water.

BACKGROUND OF THE INVENTION

Contemporary water valves are utilized in a variety of applications, including but not limited to controlling water flow in appliances such as ice makers, humidifiers, etc. Such water valves may be solenoid actuated and are typically controlled by an electronic controller to dispense a predetermined amount of water. In general, the contemporary water valve includes an operator body, i.e. a housing, having an inlet and an outlet and a flow path through the housing between the inlet and the outlet. A valve member assembly is interposed between the inlet and the outlet along the flow path to open the flow path so that water may flow through the housing from the inlet to the outlet, and close the flow path to prevent water from flowing through the housing from the inlet to the outlet.

The valve member assembly may take on a variety of forms. One example is a flexible diaphragm with an insert attached thereto. Examples of such a configuration may be readily seen at U.S. Pat. No. 4,500,067 to Zukausky titled "Pilot Operated Low Flow Valve" and U.S. Pat. No. 11,112,025 to Bartow titled "Water Valve Guide Tube with Integrated Weld Ring and Water Valve Incorporating Same" the entire teachings and disclosures of which are incorporated herein by reference. Actuation of valve member assemblies of these types is achieved via an armature acted upon by a solenoid attached to the valve. More particularly, a guide tube is attached to the housing of the valve. The guide tube, as its name suggests, includes a tube having a closed end which contains and guides the armature. A spring is also included within the guide tube and biases the armature into contact with the valve member assembly. An electronically controlled solenoid coil is attached to the exterior of the guide tube and provides the electromagnetic force necessary to move the armature within the guide tube. Movement of the armature opens the valving member to allow water to flow therethrough.

Use of such electronically controlled solenoid actuated water valves has increased due to the ability to accurately control the amount of water dispensed upon each activation. Indeed, consumers continue to demand more and more accurate flow in order to use precise amounts of water. This is particularly true as consumers seek to conserve water and energy, particularly for hot water.

The current technologies being widely used to ensure such precision dispensing of water are flow controls and/or flow meters. Using such technology in the appliance industry, current valves typically have a tolerance for flow of between 3% to 5% for the full pressure range of a home or business in which such an appliance is installed, which typically ranges from 10 to 150 psi.

This variance is likely due to the way flow is controlled and/or measured in current valves. That is, current flow controls in valves are able to work well for one pressure for which they were designed. However, such flow controls are not as accurate when there is a wide pressure range between installations, or in a single installation which experiences a wide pressure range at different times.

For instance, in a typical appliance valve the manufacturer specifies a certain flow rate through the valve for water pressures normally ranging from 15 to 120 psi. However, the water pressure in many installations varies beyond the manufactures specifications, resulting in an unacceptable variance in the amount of water dispensed.

Recognizing these issues, some manufacturers have incorporated the use of a flow meter of some type to measure the actual amount of water dispensed when the valve is open. Unfortunately, available flow meters often experience similar tolerance or accuracy issues that occur when the pressure range at the installation varies beyond the design parameters, which are often are exacerbated by contamination from particles and minerals in a fluid.

What is needed, therefore, is a flow control valve that can accurately provide precise dispensing of water or other fluid regardless of the pressure of the water at the installation site at the time of operation. Embodiments of the present invention provide such a flow control valve. These and other advantages of the invention, as well as additional inventive features, will be apparent from the description of the invention provided herein.

BRIEF SUMMARY OF THE INVENTION

In view of the above, embodiments of the present invention provide a new and improved water valve. More particularly, embodiments of the present invention provide a new and improved electronically controlled, solenoid actuated, water valve for dispensing a known or predetermined amount of water. Still more particularly, embodiments of the present invention provide a new and improved electronically controlled, solenoid actuated, water valve for dispensing a known or predetermined amount of water despite use in installations regardless of inlet water pressure or variance and/or variability of inlet water pressure.

In an embodiment, an inlet of the valve includes a pressure sensor to measure the water pressure connected to the valve. The electronic valve controller uses the pressure measured by the inlet pressure sensor to determine the amount of time the valve should be held open in order to provide a particular volume of water to be dispensed through the valve. In one embodiment, the controller uses a lookup table for the particular valve configuration, or a family of flow control curves illustrating the relationship between the valve/orifice configuration versus inlet pressure for same, and the sensed water pressure to find the corresponding valve opening time for a particular volume of water to be dispensed.

In another embodiment, the controller calculates the time based on these parameters knowing the flow curve characteristics of the valve/orifice combination. The controller may be programmed with the particular orifice size for the valve to which it is associated or may perform a self or manually-initiated calibration upon installation to determine same. In one embodiment, such calibration commands the valve to be opened until a given amount of water is dispensed. Based on the sensed inlet pressure and the time needed to dispense the given amount of water, the controller determines the orifice size to be used during future dispensing operations. Such calibration may occur at the factory upon assembly, or in the field after installation by service personnel.

In another embodiment, the controller dynamically controls the time the valve is held open in order to adjust for any pressure drop or rise sensed during the dispensing operation. In such an embodiment if the pressure drops or rises while dispensing the water, the flow rate will change and any original determination/lookup/calculation of time to keep the valve open is adjusted so as to not over or under dispense. In an embodiment, the controller integrates the flow as varied during such pressure changes during the dispensing operation in order to determine how much water has been dispensed despite the pressure changes and closes the valve when the proper amount of water has been dispensed.

In a further embodiment, the controller monitors the sensed inlet pressure when the valve is closed. This static inlet pressure is used in such embodiment by the controller to anticipate the possibility of a valve or pipe failure due to high pressure at the inlet. In such an embodiment, the controller commands the valve open briefly to allow a small amount of water to flow through the valve so as to reduce the static pressure and prevent a failure. If the high inlet pressure was caused by the expansion of the water in the inlet pipe during freezing, then such brief opening will reduce the pressure and likely avert a failure at that point.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there are illustrated various embodiments of a water valve providing accurate fluid flow over a wide and variable operating range of water pressure constructed in accordance with the teachings of the present invention for operation in various installations and applications. However, while various embodiments and environments will be discussed, such should be taken by way of example and not by way of limitation.

Figure 1:
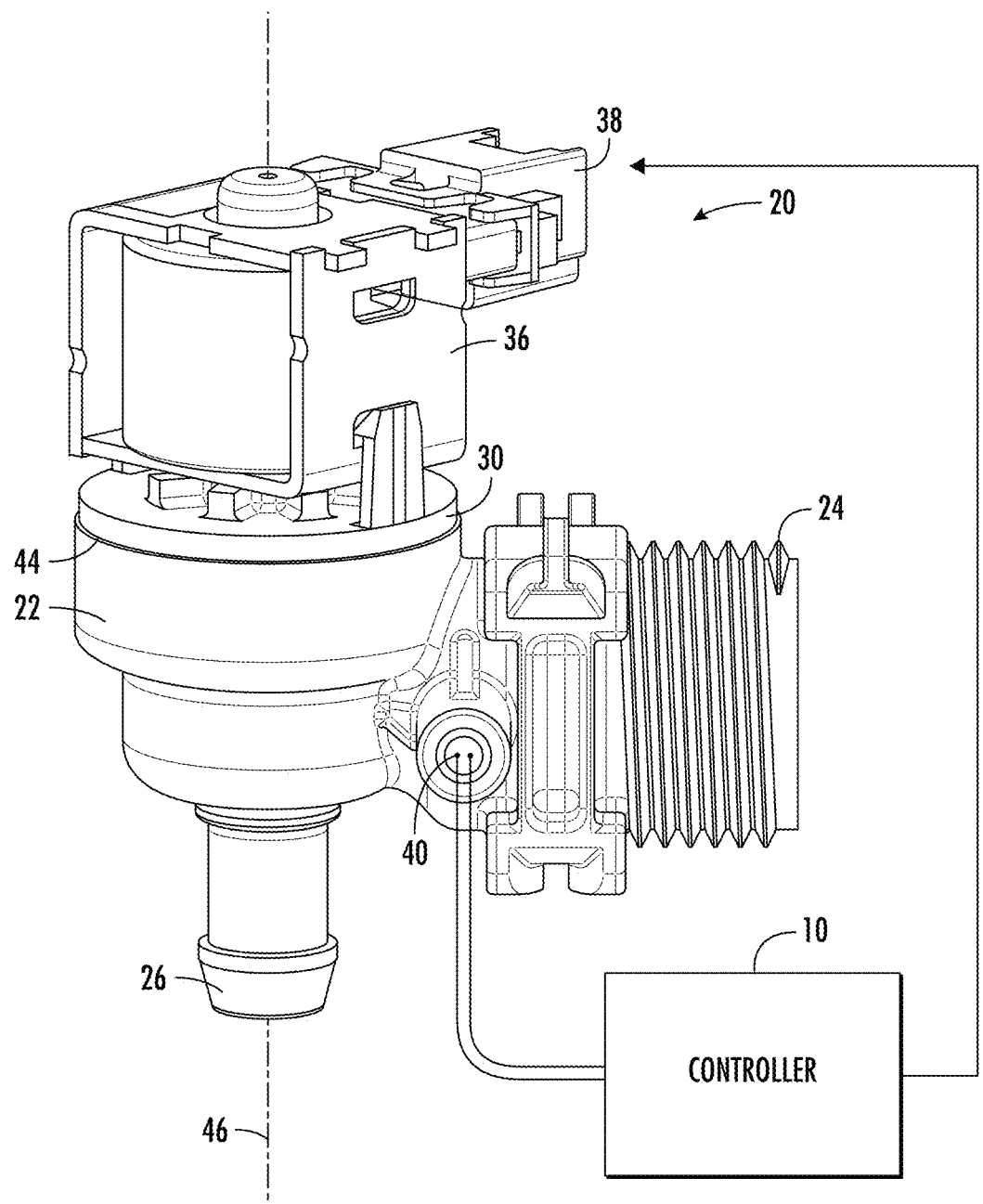
FIG. 1 is a perspective view of an embodiment of a water valve constructed in accordance with the teachings of the present invention.

With particular reference now to FIG. 1, there is illustrated an exemplary embodiment of a water valve 20. Water about 20 includes a housing 22 having an inlet 24 and an outlet 26. A flow path extends between inlet 24 and outlet 26. A valve member assembly 28 (see FIG. 3) is situated within the flow path and operable to open and close the same to allow or prevent fluid flow between inlet 24 and outlet 26 through water valve 20. Water valve 20 also includes a guide tube 30 which is attached to housing 22.

Figure 2:
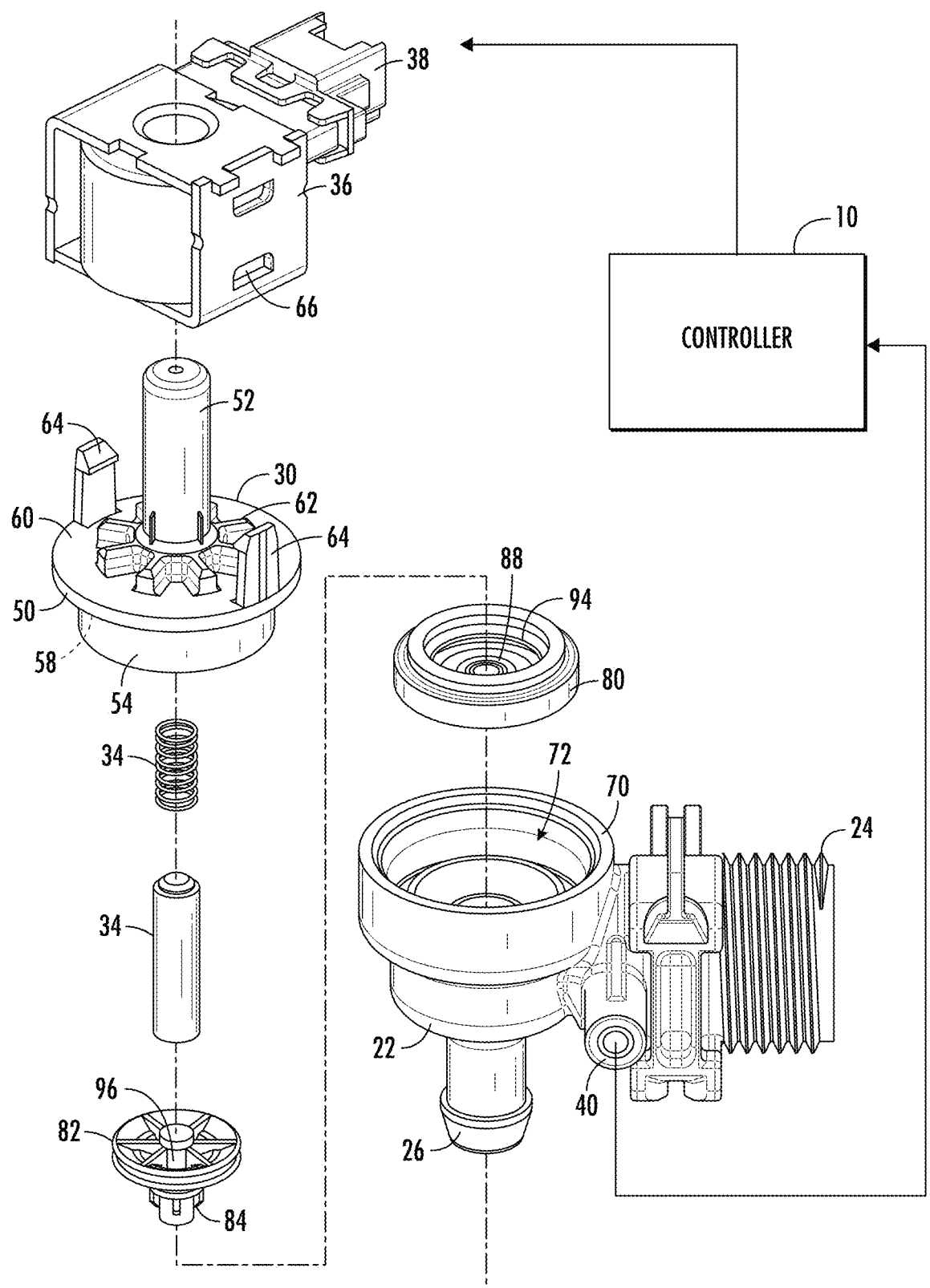
FIG. 2 is a perspective exploded view of the water valve of FIG. 1.

With reference to FIG. 2, guide tube 30 is used to contain and armature 32, which is biased within an internal bore of guide to 30 by a spring 34. Spring 34 biases armature 32 against valve member assembly 28 shown in FIG. 3 to maintain water valve 20 in a closed position, i.e. position in which fluid flow between inlet 24 and outlet 26 is prevented.

Water valve 20 also includes a solenoid actuator 36 attached to guide tube 30. Solenoid actuator 36 includes contacts 38 for an electrical connection to a valve controller 10 (see FIG. 1). Current applied to solenoid actuator 36 via the electrical connection 38 as commanded by the controller 10 causes armature 32 two move within guide tube 30 against the biasing force of spring 34 two transition water valve 20 from the closed position to an open position in which water is permitted to flow between inlet 24 and outlet 26.

As can also be seen in FIG. 1, housing 22 is threaded in the region of inlet 24 to allow for a threaded connection of an inlet supply line of water. Outlet 26 includes a hose barb style connection for connection of an outlet supply line for receiving a flow of water passing through water valve 20. Those of skill in the art will readily recognize that these threaded and hose barb connections may be omitted in favor of other connection styles without departure from the teachings of the invention herein.

Additionally, housing 22 includes a single pressure sensor 40 at the inlet 24 to measure the water pressure connected to the valve 20. Using a pressure sensor 40 at the inlet 24 of the valve 20 allows the controller 10 to determine or calculate the amount of time the valve should be opened in order to provide a particular volume of water to be dispensed through the valve 20, knowing also the area of a precise orifice 110 (see FIG. 3) through which the water will flow to the outlet 26. That is, once the flow curves for the valve/orifice combinations versus inlet pressure are established, the controller 10 can predict the flow for a certain sensed pressure and close the valve once the predetermined amount has been dispensed.

That is, the controller 10 uses a lookup table for the particular valve configuration, or a family of flow control curves illustrating the relationship between the valve/orifice configuration versus inlet pressure for same, and the sensed water pressure to find the corresponding valve opening time for a particular volume of water to be dispensed. The controller 10 can calculate the time based on these parameters knowing the flow curve characteristics of the valve/orifice combination. The controller 10 may be programmed with the particular orifice 110 size for the valve 20 to which it is associated or may perform a self or manually-initiated calibration upon installation to determine same.

If empirically determined, such calibration commands the valve 20 to be opened until a given amount of water is dispensed (as noted in a test fixture or by the service personnel). Based on the sensed inlet pressure and the time needed to dispense the given amount of water, the controller 10 determines the orifice size for the valve 20, and uses that size for calculations or lookups during future dispensing operations. Such calibration may occur at the factory upon assembly, or in the field after installation by service personnel.

The controller 10 can also dynamically control the time the valve 20 is held open in order to adjust for any pressure drop or rise sensed during the dispensing operation. That is, if the pressure drops or rises while dispensing the water, the flow rate will change and any original calculation of time to keep the valve open must necessarily be adjusted so as to not over or under fill due to such pressure change. An increase in pressure during the dispensing will shorten the time needed to dispense the predetermined amount of water, while a decrease in pressure during the dispensing will lengthen the time needed to dispense the same predetermined amount of water. The controller 10 integrates the flow as varied during such pressure changes during the dispensing operation in order to determine how much water has been dispensed despite the pressure changes and closes the valve 20 when the proper amount of water has been dispensed.

As an added benefit, the pressure sensor 40 also allows the controller 10 to determine if a valve or pipe failure is likely to occur due to high pressure at the inlet 24. In such a situation, the controller 10 can command the valve open to allow a small amount of water out of the inlet pipe in an attempt to reduce the pressure and prevent a failure. Such operation is particularly effective when the water in the inlet pipe freezes, the water expands, and the pressure increases. Unchecked, such pressure increase leads to a point where either the valve or the plumbing fails. In such a circumstance the controller 10 will sense the increase in pressure and will command the valve to open briefly. If the pressure increase was due to the freezing problem, then such brief opening will reduce the pressure and avert a failure at that point.

With attention again to FIG. 2, water valve 20 is illustrated in an exploded view. As can be seen in this view, guide tube 30 includes a circular base 50 with an extension 52 depending upwardly from base 50. More specifically, base 50 extends between lower and upper surfaces 58, 60. Extension 52 extends upwardly from upper surface 60. An annular ring 54 extends downwardly from lower surface 58. As we described in greater detail below, lower surface 58 defines a first mating surface used to mate with a second mating surface 70 formed on housing 22. Each mating surface 58, 70 is an axially facing mating surface in that it is arranged in a plane which is perpendicular to a longitudinal axis 46 (See FIG. 1) of water valve 20. This longitudinal axis 46 extends through outlet 26 as well as the length of guide tube 30.

Still referring to FIG. 2, a plurality of support ribs 62 are also formed on the upper surface 60 of base 50 and support guide tube 52 in its cantilevered extension. The number, shape, and extension of these ribs 62 may vary depending on the length of extension 52 and other factors. Additionally, a plurality of mounting tabs 64 extend from upper surface 60 of base 50. Mounting tabs 64 are used to hold solenoid actuator 36 against guide tube 30. In particular, mounting tabs 64 snap into corresponding slots 66 formed in the outer cage of solenoid actuator 36.

Figure 3:
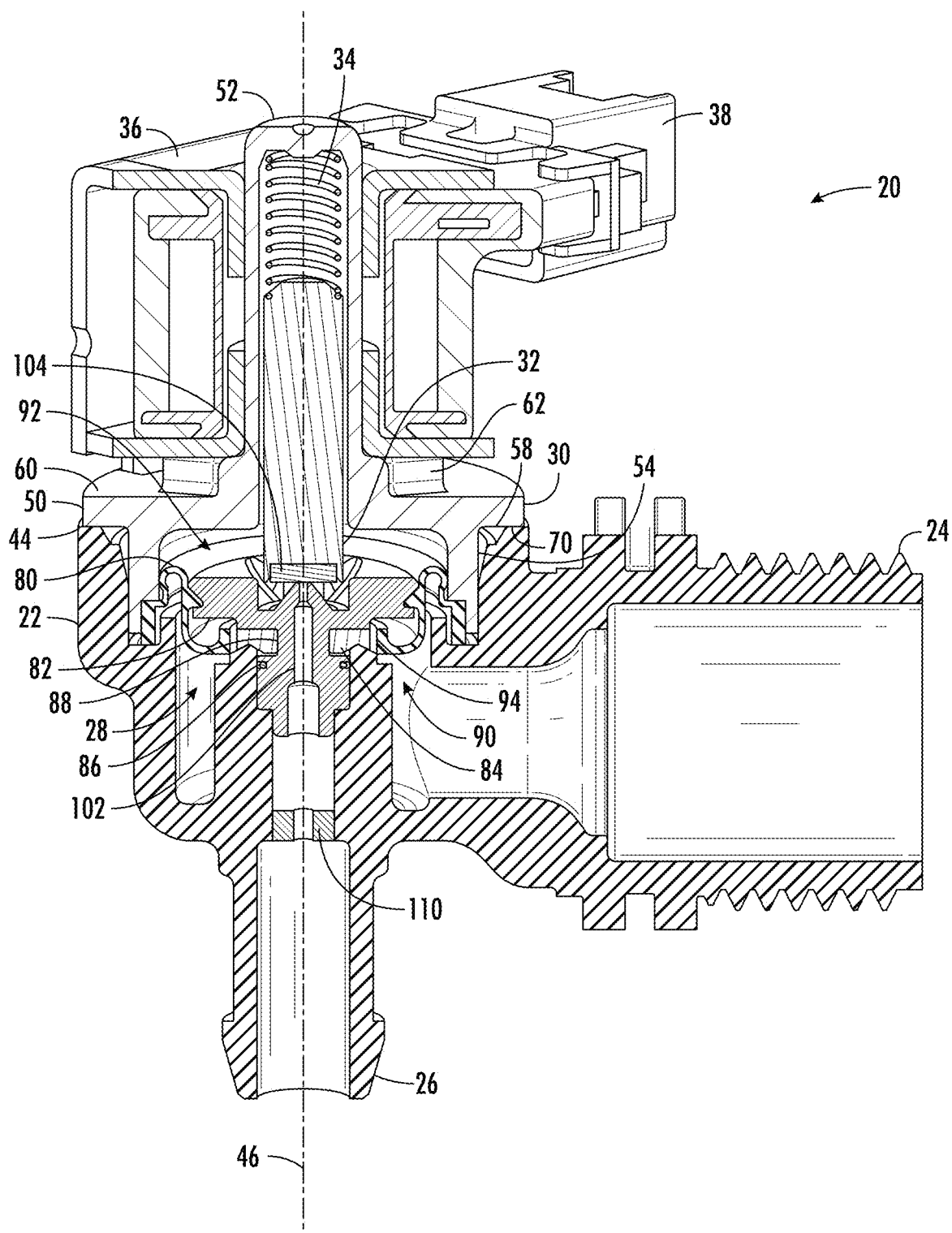
FIG. 3 is a perspective cross section of the water valve of FIG. 1.

Turning now to valve member assembly 28 illustrated in FIG. 3, the same includes a flexible diaphragm 80 with a pilot member 82 mounted thereto. Diaphragm 80 is movable within an internal chamber of housing 22 to open and close water valve 20. Armature 32 acts against pilot member 82 to apply a downward force against thereto to seat diaphragm 80 against a valve seat 86 within internal cavity of housing 22. When solenoid actuator 36 is energized to move armature 32 upwardly within guide to 30, armature 32 no longer exerts a downward force against pilot member 82 (as well as diaphragm 80 via their connection) thereby exposing a pilot passageway 102. As a result, water pressure within cavity acts upwardly against diaphragm 80 and water escapes an outlet cavity 92 via pilot passageway 102. This allows diaphragm 80 and pilot member 82 to continue to move upwardly, ultimately unseating them from valve seat 86 for full open flow.

In FIG. 3 water valve 20 is shown in the closed position. Amateur 32 is biased by spring 34 against pilot member 82 such that diaphragm 80 seemingly contacts valve seat 86. As can be seen in this view, diaphragm 80 separates internal cavity into an inlet cavity 90 and an outlet cavity 92 situated respectively on either side of diaphragm 80. In the closed position, water entering inlet 24 may proceed into inlet cavity 90. This water may then pass through diaphragm 80 by way of a plurality of passageways 94 formed through diaphragm 80. Similarly, a passageway 96 (See FIG. 2) is formed through pilot member 82. As such, in the closed position water entering inlet 24 is in fluid communication with both inlet chamber 90 and outlet chamber 92.

However, further flow of water through water valve 20 is prevented because Armature 32, and more particularly seal member 104 installed in an end of Armature 32, seals off a pilot passageway 102 through pilot member 82. Upon the application of electrical current to solenoid actuator 36, amateur 32 is moved upward in FIG. 3 to unseat seal member 104 from pilot member 82 thereby exposing the uppermost opening of pilot passageway 102 to outlet chamber 92.

Because the water in outlet chamber 92 is pressurized at the same pressure as that of the water in inlet chamber 90, and assuming the pressure through outlet 26 and passageway 102 is less than that of inlet chamber 90, this water then proceeds to evacuate from outlet chamber 92 through passageway 102 to outlet 26. This causes a pressure differential on either side of diaphragm 80 such that the pressure in the inlet chamber 90 is greater than that of the pressure in outlet chamber 92. This pressure differential thus causes diaphragm 80 to unseat from valve seat 86 thereby fully exposing the flow passage leading to the output orifice 110 to inlet chamber 90. This results in a full opening of water valve 20 allowing water to flow from inlet 24 through inlet chamber 92 and the orifice 110 and out of outlet 26. Different sized orifices 110 may be used to provide different flow characteristics for different applications.

In the illustrated embodiment an extension portion 84 which is received through the opening surrounded by valve seat 86 is fixedly retained by an opening 88 in diaphragm 80, pilot 82 moves upwardly with diaphragm 80 when transitioning from the closed position to the open position.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A water valve, comprising:
   a housing having an inlet and an outlet and a flow path extending through the housing between the inlet and the outlet;
   a pressure sensor configured to sense a water pressure at the inlet of the housing;
   a valve member assembly situated within the flow path and operable to selective open and close the flow path;
   a solenoid actuator configured to operatively open and close the valve member assembly; and
   a controller operably coupled to the pressure sensor to read the water pressure at the inlet of the housing, the controller further operably coupled to the solenoid actuator to command the solenoid actuator to open and close the valve member assembly; and
   wherein the controller is configured to determine an amount of time to hold the valve member assembly open in order to dispense a predetermined amount of water based on the water pressure at the inlet of the housing; and
   wherein the controller commands the solenoid actuator to open the valve member assembly and after the determined amount of time commands the solenoid actuator to close the valve member assembly.

2. The water valve of claim 1, further comprising a removable orifice positioned in the flow path and having an opening sized to control a flow characteristic of the valve, and wherein the controller determines the amount of time to hold the valve member assembly open in order to dispense the predetermined amount of water based on the water pressure at the inlet of the housing and a size of the opening of the removable orifice positioned in the flow path.

3. The water valve of claim 2, wherein the controller is programmed with the size of the opening of the removable orifice.

4. The water valve of claim 2, wherein the controller performs a calibration process to determine the size of the opening of the removable orifice.

5. The water valve of claim 2, wherein the controller determines the amount of time to hold the valve member assembly open in order to dispense the predetermined amount of water based on a lookup table.

6. The water valve of claim 2, wherein the controller determines the amount of time to hold the valve member assembly open in order to dispense the predetermined amount of water based on a flow control curve for the sensed water pressure, the flow control curve representing the relationship between water flow rate and the water pressure for a particular size of the opening of the removable orifice.

7. The water valve of claim 1, wherein the controller determines the amount of time to hold the valve member assembly open in order to dispense the predetermined amount of water based on a lookup table of flow rates through the flow path for different water pressures.

8. The water valve of claim 1, wherein the controller determines the amount of time to hold the valve member assembly open in order to dispense the predetermined amount of water based on a flow control curve for the sensed water pressure, the flow control curve representing the relationship between water flow rates through the flow path for different water pressures.

9. The water valve of claim 1, wherein the controller dynamically determines the amount of time to hold the valve member assembly open in order to dispense the predetermined amount of water to adjust for any change in the water pressure while the valve member assembly is open.

10. The water valve of claim 9, wherein the controller integrates an amount water dispensed during the change in water pressure in order to determine how much water has been dispensed and closes the valve when the predetermined amount of water has been dispensed.

11. The water valve of claim 1, wherein the controller monitors the water pressure when the valve member assembly is closed against a predetermined failure pressure threshold, and wherein the controller commands the valve member assembly to open briefly to allow a small amount of water to flow through the flow path when the water pressure exceeds the failure pressure threshold.

* * * * *